US 8,009,630 B2

(12) United States Patent
Boariu et al.

(10) Patent No.: US 8,009,630 B2
(45) Date of Patent: Aug. 30, 2011

(54) APPARATUS, METHOD AND COMPUTER PROGRAM PRODUCT PROVIDING NEIGHBOR DISCOVERY, HANDOVER PROCEDURE AND RELAY ZONE CONFIGURATION FOR RELAY STATIONS IN A MULTI-HOP NETWORK

(75) Inventors: Adrian Boariu, Irving, TX (US); Shashikant Maheshwari, Irving, TX (US); Shu-Shaw Wang, Arlington, TX (US)

(73) Assignee: Nokia Corporation, Espoo (FI)

( * ) Notice: Subject to any disclaimer, the term of this patent is extended or adjusted under 35 U.S.C. 154(b) by 844 days.

(21) Appl. No.: 12/074,728

(22) Filed: Mar. 5, 2008

(65) Prior Publication Data

US 2008/0219275 A1    Sep. 11, 2008

Related U.S. Application Data

(60) Provisional application No. 60/905,258, filed on Mar. 5, 2007.

(51) Int. Cl.
*H04W 4/00* (2009.01)
(52) U.S. Cl. .......................... 370/331; 455/11.1; 455/15
(58) Field of Classification Search .................. 370/331; 455/11.1
See application file for complete search history.

(56) References Cited

U.S. PATENT DOCUMENTS

| | | | |
|---|---|---|---|
| 2008/0031174 A1* | 2/2008 | Saifullah et al. | 370/311 |
| 2008/0165736 A1* | 7/2008 | Zhao et al. | 370/331 |
| 2009/0097449 A1* | 4/2009 | Jin | 370/331 |
| 2010/0159825 A1* | 6/2010 | Kang et al. | 455/11.1 |

OTHER PUBLICATIONS

"RS-amble position for Multihop Relays", IEEE 802.16 Broadband Wireless Access Working Group, 2007, 1 pg.
Adrian Boariu et al., "MRS Scanning, IEEE C802. 16j-07/282", IEEE 802.16 Broadband Wireless Access Working Group, Apr. 6, 2007, XP002494002, the whole document.
Adrian Boariu et al., "RS-amble position for Multihop Relays, IEEE C802.16j-07/038", IEEE 802.16 Broadband Wireless Access Working Group, Jan. 8, 2007, XP002494003, section Introduction.
Yuefeng Zhou et al., "Sleep Mode in MR network, IEEE C802.16j-07/010r3", IEEE 802.16 Broadband Wireless Access Working Group. Mar. 4, 2007, XP002494004, section 2 Distributed Scheduling, section 4 Specific Text Change.
Yousuf Saifullah et al., "MS Sleep Mode in MR network, IEEE C802.16j-07/035r1", IEEE 802.16 Broadband Wireless Access Working Group, Jan. 13, 2007, XP002494005, section 2 Distributed Scheduling, section 3 Specific Text Change.

(Continued)

*Primary Examiner* — Albert T Chou
(74) *Attorney, Agent, or Firm* — Harrington & Smith (57) ABSTRACT

Methods for use in multi-hop relay networks are described. One method includes receiving a first message from a first relay station requesting a temporary suspension of communication between the first relay station and one or more user equipment. In response to receiving the first message, a second message is transmitted to the one or more user equipment. The second message includes instructions to the user equipment to temporarily suspend communication with the first relay station at a specific time. A third message is transmitted to the first relay station. A scanning operation is performed at the specified time in response to receiving the third message. A second method for use in multi-hop relay networks is also described. The second method includes transmitting a neighbor information message. The neighbor information message includes a relay zone offset indicating the start of a station in a frame structure. Several apparatus are also described.

49 Claims, 6 Drawing Sheets

OTHER PUBLICATIONS

Kaibin Zhang et al., "Handover of Mobile Relay Station, IEEE C802.16j-07/147", IEEE 802.16 Broadband Wireless Access Working Group, Jan. 8, 2007, XP002494006, section Proposed Solution.

Sungkyung Kim et al., "Mobile RS Handover, IEEE C802.16j-07/122r2", IEEE 802.16 Broadband Wireless Access Working Group, Jan. 16, 2007, XP002494007, section 2, Proposed Solution.

* cited by examiner

APPARATUS, METHOD AND COMPUTER PROGRAM PRODUCT PROVIDING NEIGHBOR DISCOVERY, HANDOVER PROCEDURE AND RELAY ZONE CONFIGURATION FOR RELAY STATIONS IN A MULTI-HOP NETWORK

CROSS REFERENCE

This patent application claims priority to Provisional U.S. Application Ser. No. 60/905,258, filed Mar. 5, 2007. The disclosures of which is incorporated by reference in its entirety insofar as it does not conflict with the teachings of the present invention.

TECHNICAL FIELD

The exemplary and non-limiting embodiments of this invention relate generally to wireless communication systems, methods, devices and computer program products and, more specifically, relate to techniques for use in multi-hop relay networks.

BACKGROUND

Various abbreviations that appear in the specification and/or in the drawing figures are defined as follows:
AP access point
BS base station
DIUC downlink interval usage code
DL downlink
HO handover
MRS (M-RS) mobile RS
MS mobile station
OFDM orthogonal frequency division multiplex
RS relay station
SS subscriber station
UE user equipment
UL uplink
WiMAX world interoperability for microwave access (IEEE 802.16)

A wireless relay network is a multi-hop system in which end nodes (UE/MS/SSs, referred to for convenience hereafter as UEs) may be connected to the BS or AP via a RS. UL or DL traffic between UEs and the BS/AP may pass through and be processed by the RS. An example of a relay network concept is described in IEEE 802.16 Multi-hop Relay (MR), which is a newly established task group that is referred to as 802.16j. The MR effort is focused on defining a network system that uses RSs to extend the network coverage and/or enhance the system throughput.

SUMMARY

An exemplary embodiment in accordance with this invention is a method for use in multi-hop relay networks. The method includes receiving a first message from a first relay station. In response to receiving the first message, a second message is transmitted to one or more user equipment that is in communication with the first relay station. The second message includes instructions to the user equipment to temporarily suspend communication with the first relay station at a specific time. A third message is transmitted to the first relay station.

A further exemplary embodiment in accordance with this invention is a method for use in multi-hop relay networks. The method includes transmitting a first message to an access station serving a first relay station. A second message is received from the access station. A scanning operation is performed at a specific time in response to receiving the second message.

Another exemplary embodiment in accordance with this invention is an apparatus for use in multi-hop relay networks. The apparatus includes a transceiver; and a processing unit. The processing unit is configured to receive a first message from a first relay station via the transceiver. The processing unit is also configured to transmit via the transceiver, in response to receiving the first message, a second message to one or more user equipment that is in communication with the first relay station. The second message includes instructions to the user equipment to temporarily suspend communication with the first relay station at a specific time. The processing unit is also configured to transmit a third message via the transceiver to the first relay station.

A further exemplary embodiment in accordance with this invention is an apparatus for use in multi-hop relay networks. The apparatus includes a means for receiving a first message from a first relay station. A means for transmitting is also included. The transmitting means transmits a second message to one or more user equipment that is in communication with the first relay station in response to receiving the first message. The second message includes instructions to the user equipment to temporarily suspend communication with the first relay station. The transmitting means can also transmit a third message to the first relay station.

Another exemplary embodiment in accordance with this invention is an apparatus for use in multi-hop relay networks. The apparatus includes a transceiver and a processing unit. The processing unit is configured to transmit via the transceiver a first message to a first access station and to receive via the transceiver a second message from the first access station. The processing unit is also configured to perform a scanning operation at a specific time via the transceiver in response to receiving the second message.

A further exemplary embodiment in accordance with this invention is an apparatus for use in multi-hop relay networks. The apparatus includes a means for transmitting a first message to an access station serving a first relay station. A means for receiving a second message from the access station is also included. The apparatus also includes a means for performing a scanning operation at a specific time in response to receiving the second message.

Another exemplary embodiment in accordance with this invention is a method for use in multi-hop relay networks. The method includes transmitting a neighbor information message. The neighbor information message includes a relay zone offset of at least one neighbor access station.

A further exemplary embodiment in accordance with this invention is a method for use in multi-hop relay networks. The method includes receiving a neighbor advertising message from an access station serving a first relay station including at least one relay zone offset information of one or more neighbor access stations. The method also includes measuring a signature signal from a target access station. The target access station is one of the neighbor access stations. A handover is executed to the target access station in the relay zone indicated in the neighbor advertising message.

Another exemplary embodiment in accordance with this invention is an apparatus for use in multi-hop relay networks. The apparatus includes a transmitter configured to transmit a neighbor information message. The neighbor information message includes a relay zone offset of at least one neighbor access station.

A further exemplary embodiment in accordance with this invention is an apparatus for use in multi-hop relay networks. The apparatus includes a means for generating a neighbor information message that includes a relay zone offset of at least one neighbor access station. The apparatus also includes a means for transmitting the neighbor information message.

Another exemplary embodiment in accordance with this invention is an apparatus for use in multi-hop relay networks. The apparatus includes a transmitter and a processing unit. The processing unit is configured to receive via the transmitter a neighbor advertising message from an access station serving a first relay station which includes one or more relay zone offset information of one or more neighbor access stations. The processing unit is also configured to measure via the transmitter a signature signal from a target access station. The target access station is one of the neighbor access stations. The processing unit is also configured to execute a handover to a target access station in the relay zone indicated in the neighbor advertising message.

A further exemplary embodiment in accordance with this invention is an apparatus for use in multi-hop relay networks. The apparatus includes means for receiving a neighbor advertising message from an access station serving a first relay station including at least one relay zone offset information of one or more neighbor access stations. The apparatus also includes means for measuring a signature signal from a target access station. The target access station is one of the neighbor access stations. Means for executing a handover to the target access station in the relay zone indicated in the neighbor advertising message are also included.

Another exemplary embodiment in accordance with this invention is a method for use in multi-hop relay networks. The method includes receiving a broadcast message comprising instructions to a user equipment to temporarily suspend communication with a first relay station. The method also includes temporarily suspending communication with the first relay station, in response to receiving the message.

A further exemplary embodiment in accordance with this invention is an apparatus for use in multi-hop relay networks. The apparatus includes a transceiver and a processing unit. The processing unit is configured to receive, via the transceiver, a broadcast message comprising instructions to temporarily suspend communication with a first relay station. The processing unit is also configured to temporarily suspend communication with the first relay station, in response to receiving the message.

Another exemplary embodiment in accordance with this invention is an apparatus for use in multi-hop relay networks. The apparatus includes a means for receiving a broadcast message comprising instructions to a user equipment to temporarily suspend communication with a first relay station. The method also includes a means for temporarily suspending communication with the first relay station, in response to receiving the message.

DETAILED DESCRIPTION

The exemplary embodiments of this invention are related to a mobile multi-hop relay station, referred to herein as a RS. The RS is useful for extending coverage and/or throughput of a BS. The exemplary embodiments of this invention provide neighbor discovery, handover and relay zone configuration procedures for the RS. One non-limiting embodiment of this invention is described in the context of IEEE 802.16 technology, also known as WiMAX.

The exemplary embodiments of this invention address the problem of RS neighbor discovery and employ the use of a UE sleep or scanning mode that permits the RS not to serve its attached UEs 14 during some prescribed period of time, therefore allowing the RS to monitor its environment. Examples of messages are provided in order to support this feature.

In a mobile wireless network it is important to provide information to the UE about the surrounding base transceiver stations (BTSs) or RSs in order to allow the UE to perform fast neighbor discovery. This is accomplished by periodically broadcasting from the BTS/RS a message containing a list of the neighbor BSs/RSs.

For the case when the RSs are present in the network, and especially in the case when they operate in the time division duplex (TTD) mode, the broadcast message is enhanced in order to provide additional information.

The exemplary embodiments of this invention are described herein in the context of the WiMAX system, but the use of these exemplary embodiments should not be construed as being limited to only this one particular wireless communication system. The description also assumes for convenience, but not as a limitation, that the wireless communication system operates in a TDD manner, where the DL and the UL are transmitted in the same bandwidth in a time division manner.

Figure 1:
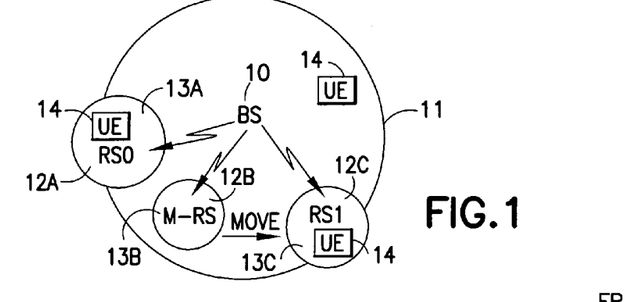
FIG. 1 shows an example of a mobile RS moving into the coverage area of another RS (RS1).

Referring to FIG. 1 there is shown an exemplary case where a BS 10 serves three RSs 12A, 12B, 12C (RS0, M-RS and RS1, respectively), collectively referred to as RS 12. The BS 10 has a coverage area 11, and each RS 12A, 12B and 12C has an associated coverage area 13A, 13B, 13C, respectively. Each RS 12 is assumed to have some number of attached UEs 14 that are served by the RS 12. The mobile RS (M-RS) 12B is assumed in this example to be moving towards the RS1 12C such that it will enter the coverage area 13C. As can be appreciated, the M-RS 12B needs to detect that it is approaching the coverage area 13C of RS1 12C in order to avoid interference and/or to perform a HO to RS1 12C, which may have a stronger signal in its coverage area than the signal that the M-RS 12B currently receives from the BS 10.

Figure 2A:
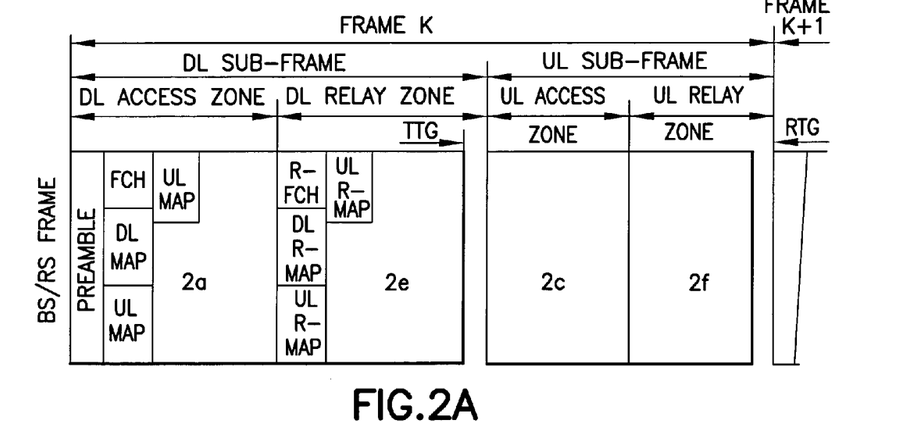
FIGS. 2A and 2B, collectively referred to as FIG. 2, depict an example of a configuration for a relay frame structure.
Figure 2B:
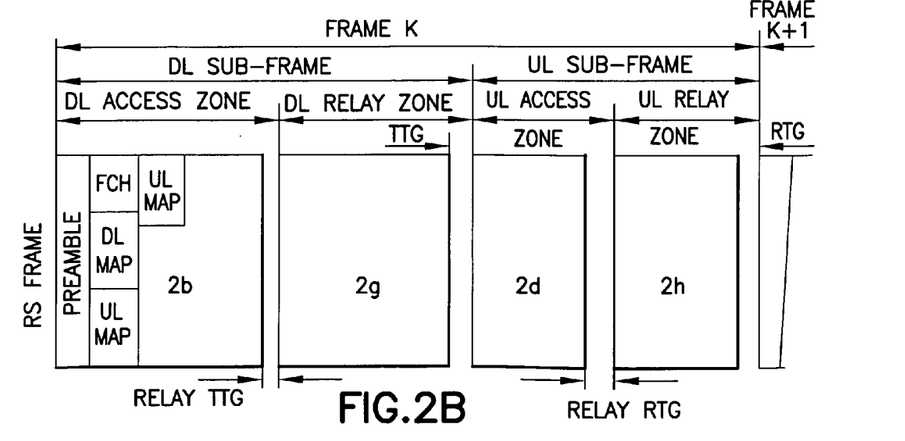

FIG. 2 presents a configuration for a relay frame structure in the TDD mode. FIG. 2A represents the frame structure for an access station (BS/RS frame), while FIG. 2B shows the RS frame structure. An access station (or access point) is considered herein to be the station at the point of direct access into the network for a given UE 14 or RS 12. In FIG. 2 both frame structures have access zones for DL (2a, 2b) and UL (2c, 2d), where the attached UEs 14 are served by the corresponding BS/RS. The access station of FIG. 2A also has a RS relay zone (DL Relay Zone 2e) where it transmits to its attached RS(s) (FIG. 2B), and an UL Relay Zone 2f in which it receives from attached RS(s). The RS frame in FIG. 2B also includes a DL Relay Zone 2g for downlink reception as well as an UL Relay Zone 2h for transmission to the superordinate RS, or with the BS 10.

A frame control header (FCH) and the corresponding mappings (MAPs) for DL and UL are transmitted in the frame structure in order to allow the UEs 14 to perform detection. Transmission/reception timing gaps (TTG/RTG) are inserted in order to allow the RF circuitry to switch from transmission to reception and vice-versa (it being remembered that the wireless communication system of interest is assumed to operate in a TTD manner).

Because the transmissions are time-aligned, all BS/RSs transmit their access preamble (that uniquely identifies the BS/RS) at the same time. A result is that an attached RS 12 in the multi-hop network cannot listen to the associated parent access preamble because the RS 12 has to transmit its own preamble at the same time for its attached downstream UEs 14 (as an example, in FIG. 1 the BS 10 would be considered the parent of RS0 12A).

The mobile RS 12B may need (depending at least on its velocity) to sense continuously or at least periodically its radio frequency environment in order to avoid interference, as well as to be prepared to perform a HO when the situation requires it. Because the RS 12 has to operate as a BS from the perspective of the UEs 14 attached to it, and as a UE 14 from the perspective of the BS, it is necessary for the RS 12 to perform a series of transmission/receptions (TX/RX) operations during the duration of a frame (see FIG. 2). However, this type of operation allows less time to perform a scanning operation of the environment in order to detect the surrounding BSs/RSs. In general, the RSs 12 obtain information about the surrounding BSs/RSs via a neighbor list that is provided to all RSs/UEs in the coverage area of the access station (e.g., the BS 10). However, the actual BSs/RSs that are in closest proximity to a mobile RS 12B can be fewer than those indicated in the neighbor list, and their level of interference can differ significantly.

One potential solution to sensing the actual radio frequency environment is to provide a means for the BSs/RSs to transmit/receive a unique specific signal (similar to the preamble, but at a different location in the frame, a RS-amble) at a certain time interval. The RS-amble serves as a relay-specific signature for that particular BS/RS, so that other RSs can detect the presence of the BS/RS 10, 12. While this solution is attractive, it comes at the cost of reducing the throughput of the system due to the fact that the signature signal required to be transmitted by all the BS/RS during a frame may require, for example, one or two OFDM symbols, thereby consuming some portion of the frame duration and bandwidth.

Reference with regard to the RS-amble may be had to IEEE C802.16j-07/038, "RS-amble position for Multihop Relays", Adrian Boariu, Shashikant Maheshwari, Peter Wang, Yousuf Saifullah.

The exemplary embodiments of this invention provide an improved and enhanced solution to the problem of the RS 12 sensing its environment and monitoring its neighborhood. The exemplary embodiments of this invention operate to place UEs 14 attached to the RS in a sleep or scanning mode, thus allowing the RS 12 to monitor for preambles of other RSs during a time in the frame when it would normally be serving the attached UEs 14. By the use of this technique the specific RS preamble (RS-amble) is not needed, thereby conserving bandwidth.

To even further clarify, in the current 802.16, a message MOB_SLP_RSP can be used to put a UE 14 into the sleep mode, and implicitly means that no DL or UL traffic will be scheduled for the UE 14 by the BS 10. A message MOB_SCN_RSP can be used to put an attached UE 14 into a scanning mode to perform scanning for some period of time, and also implicitly means that no DL or UL traffic will be scheduled for the UE 14 by the BS 10. Either message can be utilized by the exemplary embodiments of this invention, as both achieve the objective of creating a short term disruption of communication with the UE 14. It can be noted that the MOB_SLP_RSP message is optional in 802.16, and either message can be used and still be backwards compatible.

A further exemplary embodiment does not operate to place the UEs 14 into the sleep/scanning mode, but instead informs all attached UEs 14 via a DL-MAP of Access Zone (e.g., using extended DIUCs) that there will be no transmission and reception occurring for a certain period of time. This period can be specified as a number of frames, as one example. This approach conserves a considerable amount of bandwidth as there is no specific signaling procedure required to put the UEs 14 into the sleep/scanning mode, and assumes that the UE 14 is capable of interpreting the extended DIUC. The extended DIUC may be transmitted as a broadcast message rather than as an individual unicast message to each attached UE 14.

The exemplary embodiments of this invention provide for management of the Relay Zones 2e, 2f (see FIG. 2) where the RS/BS communicates with its upstream and downstream RSs. When the M-RS 12B moves into the coverage area of a new RS 12 that does not have a Relay Zone configured (no RS attached) but appears to have a stronger signal, the M-RS 12B can request the BS 10, or the BS 10 may decide, to configure a Relay Zone on the new RS 12 so that the M-RS 12B can communicate with the RS 12 for data transmission and reception.

Describing now the exemplary embodiments of this invention in further detail, and as was discussed previously, the RS 12 cannot scan the environment since all of the Access Zones (that pertain to UEs 14 that are attached) of the BSs/RSs are transmitted simultaneously. As a result, those preambles that can uniquely identify the BSs/RSs in the vicinity cannot be received by other RSs, since all of the TDD RSs 12 are simultaneously in the transmission mode (i.e., during the DL Access Zone period all are transmitting at the same time, and their receivers are effectively disabled).

The exemplary embodiments of this invention operate to force the UEs 14 of a RS 12 to enter a sleep/scanning mode for a short duration of time, allowing the RS 12 to operate its receiver to scan for the preambles of other BSs/RSs during the DL Access Zone period. When in the sleep/scanning mode the UE 14 knows that the RS 12 will not transmit any DL data or schedule any UL data. At this time the UE 14 may enter a low power mode of operation (e.g., a sleep period), if not scanning, to conserve battery life, since it knows not to expect to receive a transmission from its associated RS 12.

An aspect of the exemplary embodiments of this invention is the use of different sleep/scanning patterns in order to achieve different goals.

Consider as an example a situation of a fixed or a nomadic RS 12. A nomadic RS 12 is one that is considered to be fixed in location for the duration of operation, however it can be moved from one location to another and then turned on. For this case it is not necessary for the RS 12 to scan the environment continuously, as the environment can be considered to be static or quasi-static for long periods of time. Thus, the fixed/nomadic RS may have enabled a scanning period that is not periodic. For example, the scanning period may be enabled for just a few frames during periods of low traffic demand, such as during the night.

This type of operation may be based on the particular implementation of the network. In general, it is more efficient that a fixed/nomadic RS 12 is positioned in a certain location by the operator to have a predefined coverage area. The M-RS 12B is more likely to cause interference and should thus announce its presence. The fixed (during operation) RS 12 may perform some scanning in order to detect, for example, a change in its environment due to, for example, the introduction of some RF obstruction that may alter the coverage area from that of the initial deployment, or possibly also for maintenance purposes. In addition, it can be expected that if the M-RS 12B enters into the coverage area of a fixed/nomadic RS 12, then the M-RS 12B may perform scanning and may also perform some procedure to reduce interference, e.g., by changing its preamble. The M-RS 12B may report measurements made during scanning to the BS 10, thereby relieving the fixed/nomadic RS 12 from having to perform periodic scanning.

Consider as a further example a M-RS 12B that may require a periodic pattern for the sleep/scanning mode due to its environment changing continuously.

Figure 3:
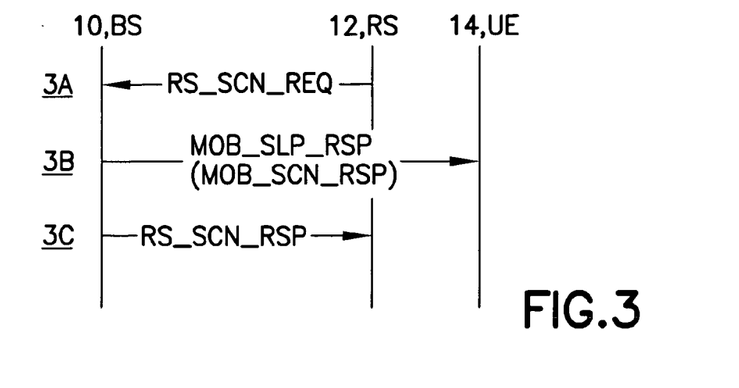
FIG. 3 presents a non-limiting example of a message signaling exchange for operation in a sleep/scanning mode for the RS of FIG. 1.

FIG. 3 presents the messages that are exchanged between the BS 10, the RS 12 and the UE 14 to operate the RS 12 in the scanning mode for neighbor discovery, in accordance with the exemplary embodiments of this invention. Note that the signaling for operation in the scanning mode for UEs 14 is shown in parenthesis. In a RS_SCN_REQ message 3A the RS 12 requests permission from the BS 10 to enter the scanning mode. The RS_SCN_REQ message includes configuration parameters such as an indication of how the UEs 14 would operate (in scanning or sleep mode). Assuming that the BS 10 accepts the RS_SCN_REQ message request, it instructs the UEs 14 to operate in one of the sleep mode (the MOB_SLP_RSP message) or the scanning mode (the MOB_SCN_RSP message). Both of these messages are indicated as message 3B in FIG. 3. Next the BS 10 informs the RS 12 of the acceptance of the RS_SCN_REQ message in a RS_SCN_RSP message 3C. The RS 12 may request a periodic pattern of sleep/scanning operation of the UE 14, or may make the request in response to some trigger condition being satisfied, such as the signal strength of the attached access station falling below some threshold.

However, and as was also discussed above, it is within the scope of the exemplary embodiments of this invention to send an indication in the DL-MAP that will force UEs 14 into a disconnect mode for a short period of time (where the D-MAP may specify the disconnect period as some number of frames).

At this point the RS 12 may scan the environment to identify the surrounding BSs/RSs, and may gather information with respect to signal strengths of the surrounding BSs/RSs. It is important to note that although the RS 12 is not serving the UEs 14 attached to it during the scanning operation, the RS 12 is still capable of communicating during the Relay Zone frame periods 2g, 2h (see FIG. 2) with its own access station and RSs that are attached to it.

Figure 4:
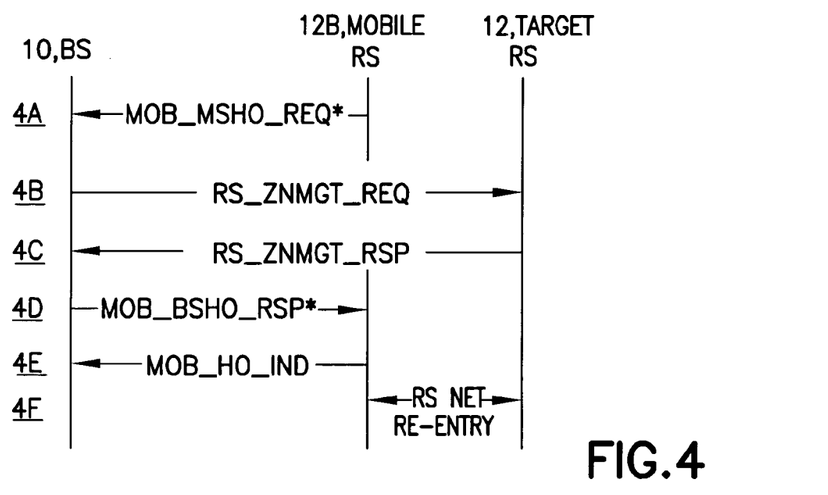
FIG. 4 shows an example of relay-zone creation and a handover procedure for the RS.

The M-RS 12B should also have knowledge of where neighboring RSs 12 have their RS zone that holds information about MAPs that pertain to RS zones. This is particularly true during the HO procedure. From FIG. 2A it can be noticed that the BS 10 (access station) has two different MAPs, one in the DL Access Zone 2a and one in the DL Relay Zone 2e. Either Access Zone MAP or a neighbor advertisement message may provide information with respect to the position of the FCH/MAPs in the frame of the RS zone. However, if this information is not present, then the M-RS 12B that is scanning the environment understands that the BS/RS that was identified does not have subordinate RSs to serve, i.e., it has only UEs 14 to serve. If the M-RS 12B or the BS 10 prefers to make a HO to such a BS/RS it preferably requests the BS 10 to request the target BS/RS to create a RS zone. The BS 10 may also create the RS zone for the target RS 12 independently. Upon creation of the RS zone in the RS/BS for DL and UL communication by the BS 10 and notifying the intermediate RS about newly created RS zone, the M-RS 12B is capable of performing HO by initiating a ranging operation to synchronize on the UL with the target RS (the DL is assumed to be already synchronized). This prepares the parties for a fast HO procedure that provides a smooth transition of the M-RS 12B to the new access station. An example of the messages that are exchanged to create the RS zones in a targeted BS/RS is shown in FIG. 4. Note that RS zones usually are in pairs, and RS zones are created in both the DL and in the UL subframes.

In FIG. 4 the M-RS 12B transmits to the BS 10 a MOB_MSHO_REQ message 4A that requests a HO initiation procedure. The MOB_MSHO_REQ message 4A provides, among other things, the BS 10 with information about the BSs/RSs that are detected by the M-RS 12B, and may also provide signal-to-interference ratio values measured from the detected BSs/RSs. The BS 10 examines the list of BSs/RSs provided by the M-RS 12B and, if a potential target RS 12 for HO is found in the list that does not currently have a RS zone in the frame structure (i.e., the target RS 12 is currently only communicating with UEs 14 and does not have any attached subordinate RSs), and if the target RS 12 is received with a sufficiently high signal-to-interference ratio, the BS 10 may determine to create a RS zone for the target RS 12. In this case the BS 10 sends a RS_ZNMGT_REQ message 4B to the target RS 12. The RS_ZNMGT_REQ message 4B requests the target RS 12 to create a RS zone in the frame structure. The BS 10 also informs any of its superordinate access stations of the newly created RS zone such that DL and UL communications are synchronized. The target RS 12 creates the RS zone and reports back to the BS 10 the parameters related to RS zone created, such as the RS zone position in the frame, in a response management message RS_ZNMGT_RSP (4C).

After one or more such RS zones are created in one or more target RSs 12, the BS 10 provides zone information concerning the target BS/RS for the HO procedure using a MOB_BSHO_RSP message 4D. The M-RS 12B selects a target BS/RS and informs the BS 10 of the identity of the target RS 12 using a MOB_HO_IND message, and then performs network entry with the selected target BS/RS (4F).

Generally, if a RS 12 does not have any other RS 12 attached to it then it does not require the RS zone in its frame structure to communicate with subordinate RSs. In this case the BS 10 can exchange RS_ZNMGT_REQ/RSP messages with the RS 12 to delete the unnecessary RS zone from the access RS. Note, however, that the access RS 12 may still require a RS zone to communicate with an upstream (superordinate) RS.

As was discussed above, another technique to provide information concerning the surrounding RSs 12 is to insert a RS-amble into the frame structure. If the RS-amble is used for monitoring the environment, then the M-RS 12B need not request that attached UEs 14 be placed into the sleep/scanning mode for scanning the surroundings as the M-RS 12B can scan for the RS-amble at a predefined position in the frame. However, using this procedure the M-RS 12B does not have information about the start position of the RS-zone in the frame, and the M-RS 12B may not be capable of performing a fast HO since it does not know the position of the RS-zone in the targeted BS/RS. The offset information (i.e., the start position of RS's Relay Zone in the frame) which is important to achieve a smooth HO procedure and for receiving UL/DL system parameters, may be provided by either enhancing the neighbor advertisement message, or by exchanging explicit signaling between the BS 10 and the RS 12.

Figure 5:
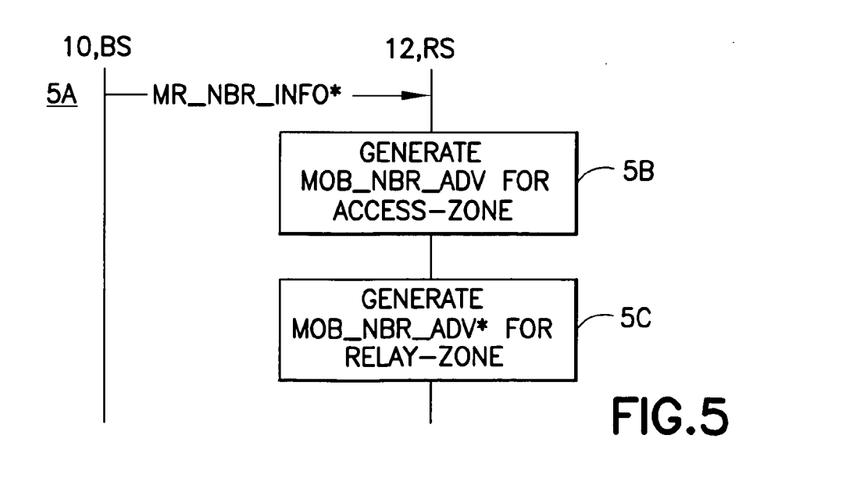
FIG. 5 shows an example of an enhanced neighbor list for RSs.

This procedure is depicted in FIG. 5. The BS 10 sends to the RS 12 a MR_NBR_INFO message 5A on the relay link which provides information about the neighbors of the RS 12. The MR_NBR_INFO message 5A also includes information describing the start position of neighboring RS Relay Zones. Upon receipt of the MR_NBR_INFO message 5A the RS 12 generates a MOB_NBR_ADV message 5B for the access link and may generate a similar message 5C for the relay link. The offset (start position) of RS 12 relay-zone forms a part of the MOB_NBR_ADV message that is sent to the relay link.

Note that the offset information can also be provided by explicitly exchanging the signaling between the BS 10 and the RS 12.

The exemplary embodiments of this invention are particularly well suited for use with moderate M-RS 12B velocities. At higher velocities it may be desirable to employ the RS-amble as substantially continuous monitoring of the (changing) environment is enabled.

Figure 6:
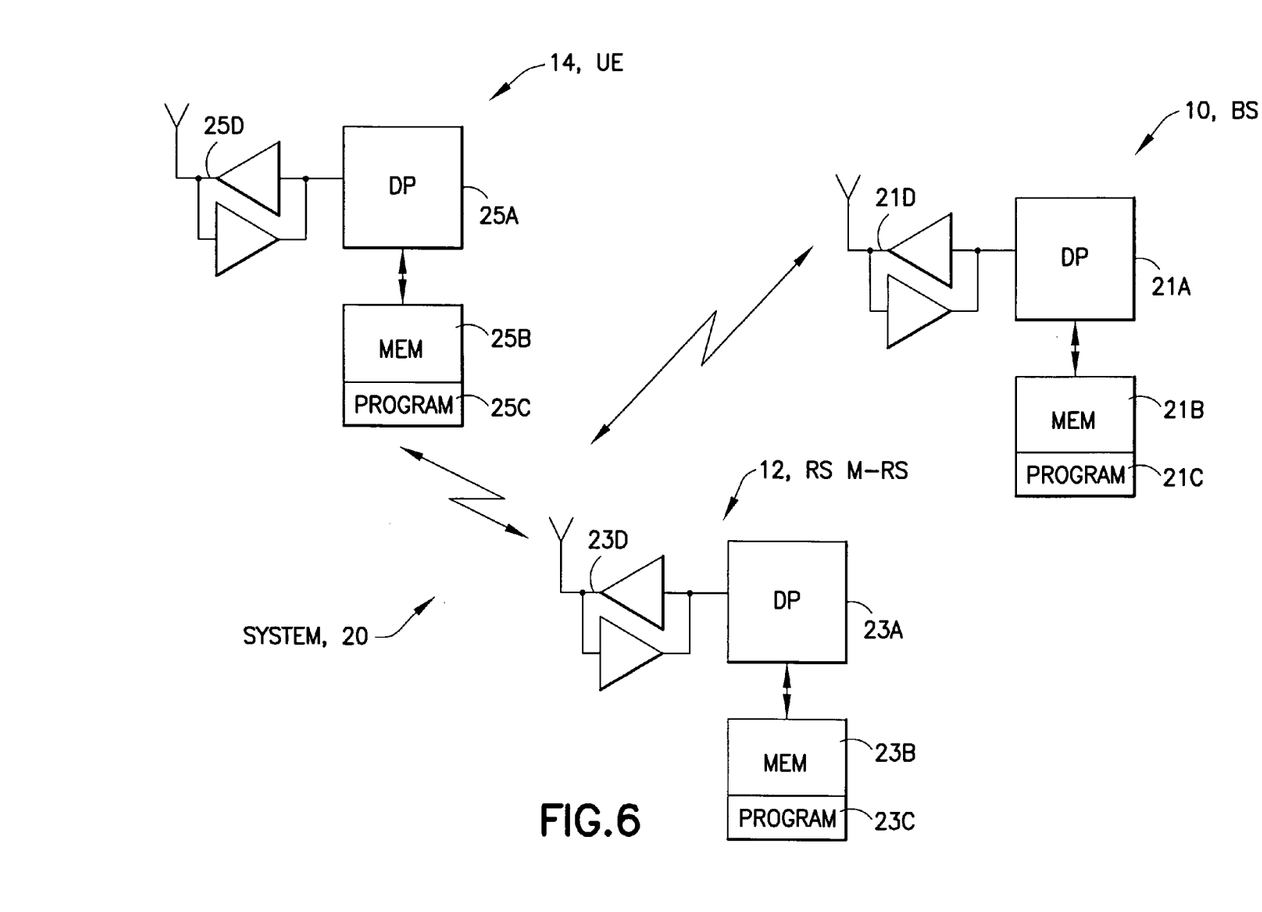
FIG. 6 shows an overall block diagram of a system, such as a WiMAX-based system, that is suitable for use in implementing the exemplary embodiments of this invention.

FIG. 6 shows an overall block diagram of a system 20, such as a WiMAX-based system, that is suitable for use in implementing the exemplary embodiments of this invention. The system 20 includes at least one BS 10 constructed to include a data processor (DP) 21A, a memory 21B that stores a program 21C, and a suitable wireless transceiver 21D for communicating with at least one RS/M-RS 12 and possibly with at least one UE 10. The RS/M-RS 12 is similarly constructed to include a data processor 23A, a memory 23B that stores a program 23C, and a suitable wireless transceiver 23D for communicating with the BS 10 and with at least one UE 10, and possibly with another RS/M-RS 12. The UE 10 may also be similarly constructed to include a data processor 25A, a memory 25B that stores a program 25C, and a suitable wireless transceiver 25D for communicating with either the RS/M-RS 12 or the BS 10. The transceivers 21D, 23D, 25D may include two or more antennas and associated circuitry, or just the one antenna as shown. The programs 21C, 23C, 25C are each configured to include program instructions that, when executed by the associated DP 21A, 23A, 25A, respectively, result in the operations in accordance with the exemplary embodiments of this invention as described above in reference to FIGS. 3, 4 and 5.

Note in FIG. 6 that the M-RS 12B can be a UE 14 that is operating as a relay station.

In general, the exemplary embodiments of this invention may be implemented at least in part by computer software executable by the DPs 21A, 23A, 25A, or by hardware, or by a combination of software and hardware.

In general, the various embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or -terminals that incorporate combinations of such functions.

The memories 21B, 23B, 25B may be of any type suitable to the local technical environment and may be implemented using any suitable data storage technology, such as semiconductor-based memory devices, magnetic memory devices and systems, optical memory devices and systems, fixed memory and removable memory. The DPs 21A, 23A, 25A may also be of any type suitable to the local technical environment, and may include one or more of general purpose computers, special purpose computers, microprocessors, digital signal processors (DSPs) and processors based on a multi-core processor architecture, as non-limiting examples.

Figure 7:
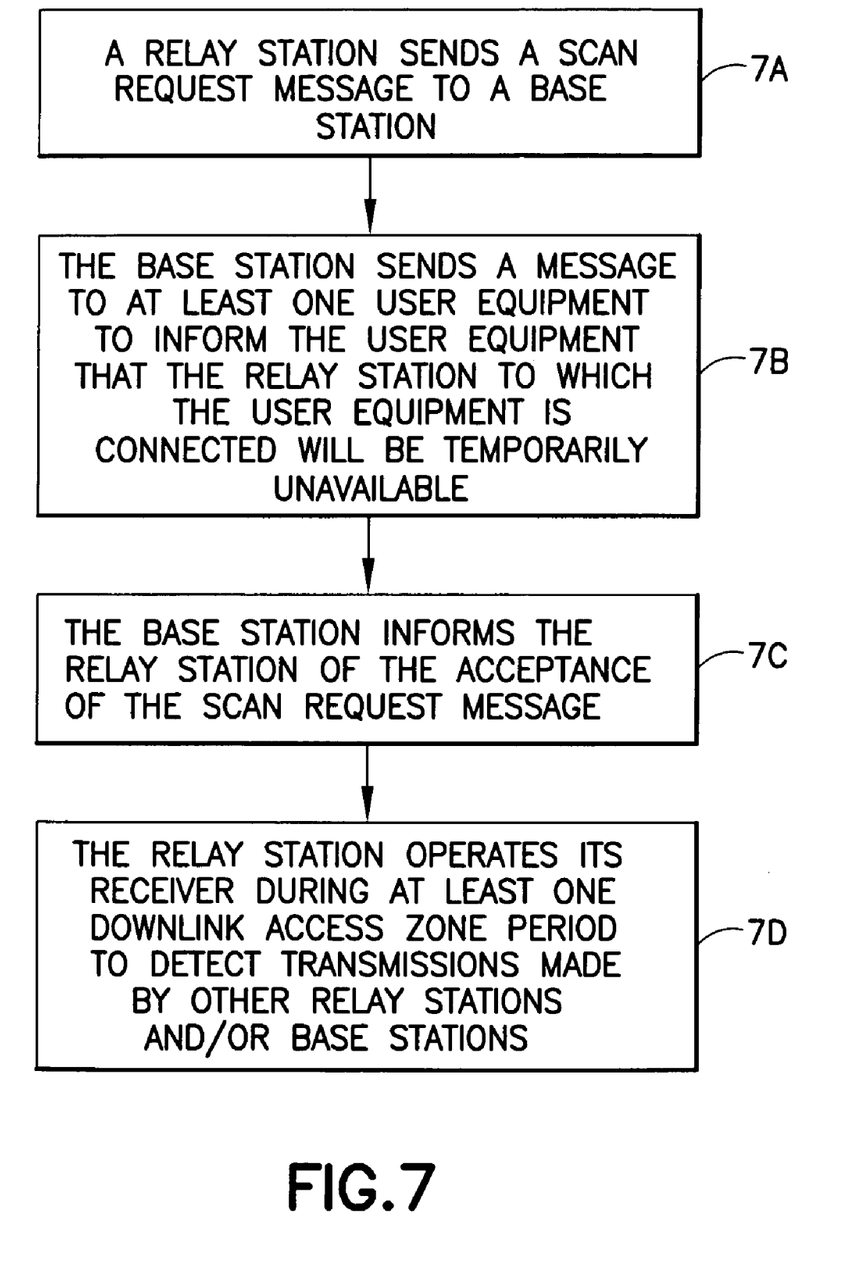
FIGS. 7, 8 and 9 are each a logic flow diagram descriptive of a method, and the operation of a computer program product, in accordance with exemplary embodiments of this invention.

Based on the foregoing it should be apparent that the exemplary embodiments of this invention provide a method, apparatus and computer program product(s) to enable a relay station to acquire knowledge of its radio frequency environment. Referring to FIG. 7, the relay station sends a scan request message to a base station (Block 7A), the base station sends a message to at least one user equipment to inform the user equipment that the relay station to which the user equipment is connected will be temporarily unavailable (Block 7B), the base station informs the relay station of the acceptance of the scan request message (Block 7C), and at Block 7D the relay station operates its receiver during at least one downlink access zone period to detect transmissions made by other relay stations and/or base stations.

Figure 8:
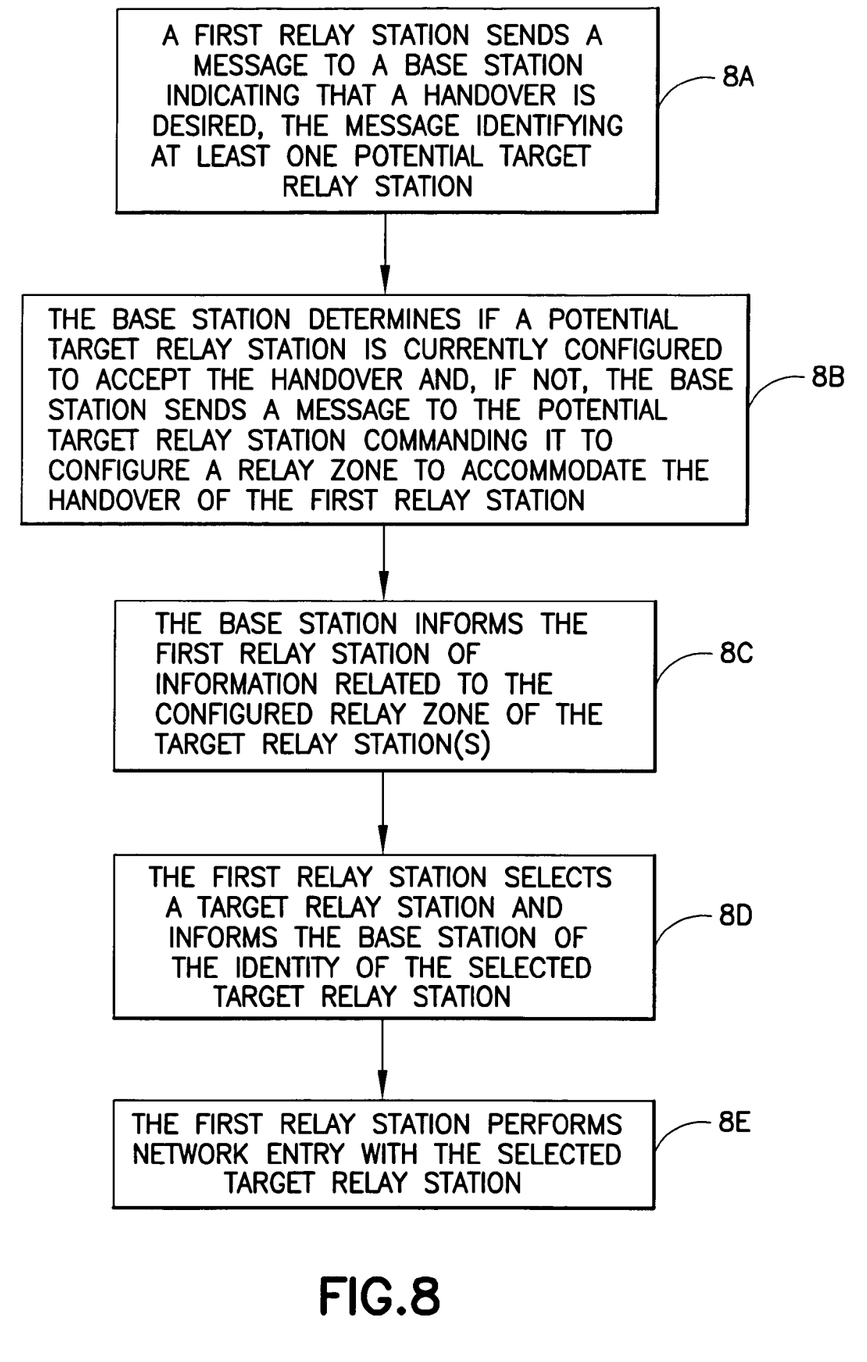

Based on the foregoing it should be apparent that the exemplary embodiments of this invention also provide a method, apparatus and computer program product(s) to enable a relay station to handover to another relay station. Referring to FIG. 8, at Block 8A a first relay station sends a message to a base station indicating that a handover is desired, where the message identifies at least one potential target relay station, at Block 8B the base station determines if a potential target relay station is currently configured to accept the handover and, if not, the base station sends a message to the potential target relay station commanding it to configure a relay zone to accommodate the handover of the first relay station, at Block 8C the base station informs the first relay station of information related to the configured relay zone, at Block 8D the first relay station selects a target relay station and informs the base station of the identity of the selected target relay station, and at Block 8E the first relay station performs network entry with the selected target relay station.

The techniques disclosed in FIGS. 7 and 8 may include the base station enhancing a neighbor advertisement message or by exchanging explicit signaling between the base station of the relay station to inform the relay station of the locations of relay zones of neighboring relay stations and/or base stations. The technique disclosed in FIG. 7 may also be enhanced through the use of a RS-amble signal.

Figure 9:
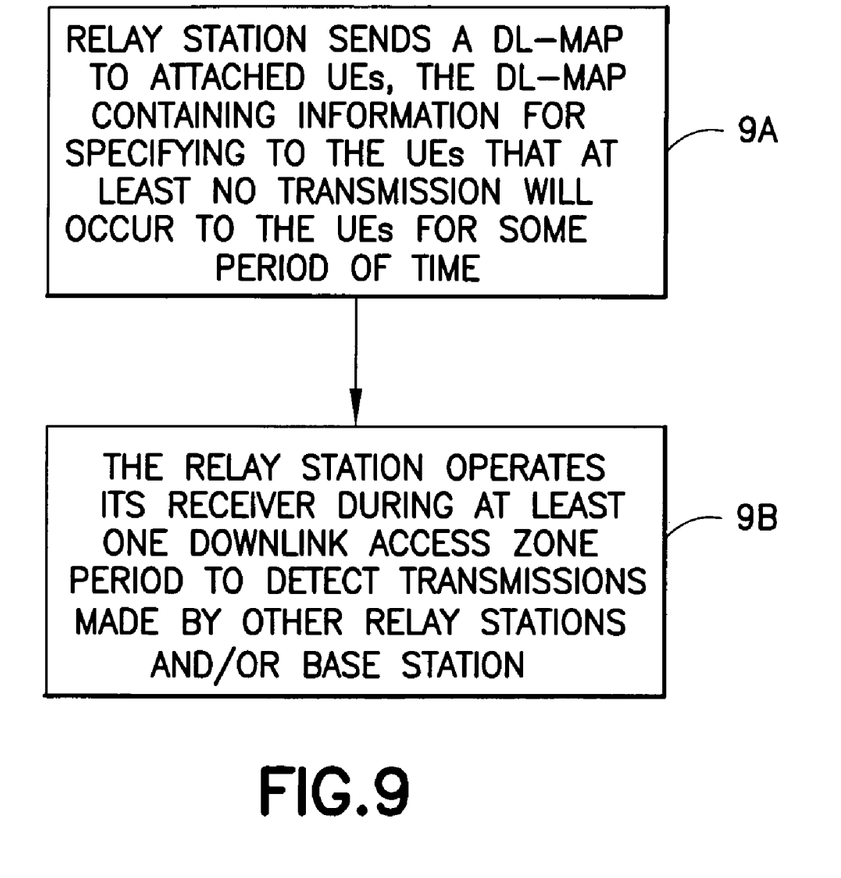

Based on the foregoing it should also be apparent that the exemplary embodiments of this invention provide a further method, apparatus and computer program product(s) to enable a relay station to acquire knowledge of its radio frequency environment. Referring to FIG. 9, the relay station sends a DL-MAP to attached UEs, the DL-MAP containing information for specifying to the UEs that at least no transmission will occur to the UEs for some period of time (Block 9A); and at Block 9B the relay station operates its receiver during at least one downlink access zone period to detect transmissions made by other relay stations and/or base stations.

In the method, apparatus and computer program product(s) of the preceding paragraph, where the information sent to the UEs may be contained in an extended DIUC, and may specify the period of time as being one or more frame periods. During the specified period of time the UEs may enter a sleep mode, if desired, to conserve battery power.

The various blocks shown in FIGS. 7, 8 and 9 may be viewed as method steps, and/or as operations that result from operation of computer program code, and/or as a plurality of coupled logic circuit elements constructed to carry out the associated function(s).

It should be appreciated that aspects of the exemplary embodiments of this invention reside in each of the BS 10 and the RS/M-RS 12, as well as in the UE 14 in that it responds to the DL-MAP from the M-RS 12B so as not to expect at least a DL transmission from the M-RS 12B for some specified period of time.

An exemplary embodiment in accordance with this invention is a method for use in multi-hop relay networks. The method includes receiving a first message from a first relay station. In response to receiving the first message, a second message is transmitted to one or more user equipment that is in communication with the first relay station. The second message includes instructions to the user equipment to temporarily suspend communication with the first relay station. A third message is transmitted to the first relay station In a further exemplary embodiment of the method above, the second message includes either instructions to place the user equipment in a sleep mode, instructions to place the user equipment in a scan mode or instructions that no transmission and reception should occur for a period of time. If the second message includes instructions that no transmission and reception should occur for a period of time then the period of time may be specified as a number of frames.

In another exemplary embodiment of any of the methods above, the second message includes an extended downlink interval usage code.

In a further exemplary embodiment of any of the methods above, the first message includes an indication of a preferred user equipment instruction. The second message may include the preferred user equipment instruction. The preferred user equipment instruction may be a sleep mode instruction or a scan mode instruction.

In another exemplary embodiment of any of the methods above, the methods also include receiving one or more measured signal strengths and/or one or more measured signal-to-interference ratios.

In a further exemplary embodiment of any of the methods above, the methods also include receiving a request for a handover to a target access station.

In another exemplary embodiment of any of the methods above, the methods also include transmitting a fourth message to one or more target access station including instruction to create a relay zone in a frame structure of the target access station; and performing a fast handover of the first relay station to one of target access stations. The methods may also include transmitting information concerning the one or more target access station to the first relay station; and receiving a selection of one of the target access stations, wherein the fast handover is performed with the selected target access station.

In a further exemplary embodiment of any of the methods above, the methods are performed in a WiMax system.

In another exemplary embodiment of any of the methods above, the methods are performed as a result of execution of computer program instructions stored in a computer readable memory medium.

A further exemplary embodiment in accordance with this invention is a method for use in multi-hop relay networks. The method includes transmitting a first message to an access station serving a first relay station. A second message is received from the access station. A scanning operation is performed in response to receiving the second message.

In another exemplary embodiment of the method above, the first message includes an indication of a preferred user equipment instruction. The preferred user equipment instruction may be a sleep mode instruction or a scan mode instruction.

In a further exemplary embodiment of any of the methods above, the scanning operation is performed during a downlink access zone period.

In another exemplary embodiment of any of the methods above, the scanning operation includes receiving a preamble from a second relay station.

In a further exemplary embodiment of any of the methods above, the first message is transmitted in response to a trigger condition being satisfied. The trigger condition may be a determination that the signal strength of a serving access station has fallen below a threshold.

In another exemplary embodiment of any of the methods above, the scanning operation includes measuring one or more signal strengths. The methods may also include transmitting the one or more measured signal strengths to the access station.

In a further exemplary embodiment of any of the methods above, the methods include determining whether a target access station serves a subordinate relay station. The determination may include determining whether a transmitted frame structure from the target access station includes downlink mappings. The methods may also include transmitting a third message requesting a handover to the target access station in response to determining that the target access station does not serve a subordinate relay station. A handover response message including zone information of the target access station may also be received.

In another exemplary embodiment of any of the methods above, the methods include receiving information concerning one or more target access station. One of the target access stations is selected. The selection is transmitted.

In a further exemplary embodiment of any of the methods above, the methods are performed in a WiMax system.

In another exemplary embodiment of any of the methods above, the methods are performed as a result of execution of computer program instructions stored in a computer readable memory medium.

A further exemplary embodiment in accordance with this invention is an apparatus for use in multi-hop relay networks. The apparatus includes a transceiver; and a processing unit. The processing unit is configured to receive a first message from a first relay station via the transceiver. The processing unit is also configured to transmit via the transceiver, in response to receiving the first message, a second message to one or more user equipment that is in communication with the first relay station. The second message includes instructions to the user equipment to temporarily suspend communication with the first relay station. The processing unit is also configured to transmit a third message via the transceiver to the first relay station.

In another exemplary embodiment of the apparatus above, the second message includes instructions to place the user equipment in a sleep mode, to place the user equipment in a scan mode or that no transmission and reception should occur for a given time. If the second message includes instructions that no transmission and reception should occur for a given time, the given time may be specified as a number of frames.

In a further exemplary embodiment of any of the apparatus above, the second message includes an extended downlink interval usage code.

In another exemplary embodiment of any of the apparatus above, the first message includes an indication of a preferred user equipment instruction. The second message may include the preferred user equipment instruction. The preferred user equipment instruction may be a sleep mode instruction or a scan mode instruction.

In a further exemplary embodiment of any of the apparatus above, the processing unit is also configured to receive via the transmitter one or more measured signal strengths and/or measured signal-to-interference ratios.

In another exemplary embodiment of any of the apparatus above, the processing unit is also configured to receive via the transmitter a request for a handover to a target access station.

In a further exemplary embodiment of any of the apparatus above, the processing unit is also configured to transmit via the transceiver a fourth message to one or more target access stations including instruction to create a relay zone in a frame structure of the target access station; and to perform a fast handover of the first relay station to one of the target access stations. The processing unit may also be configured to transmit via the transceiver information concerning the one or more target access stations to the first relay station; and to receive via the transceiver a selection of one of the target access stations. The fast handover may be performed with the selected target access station.

Another exemplary embodiment in accordance with this invention is an apparatus for use in multi-hop relay networks. The apparatus includes a means for receiving a first message from a first relay station. A means for transmitting is also included. The transmitting means transmits a second message to one or more user equipment that is in communication with the first relay station in response to receiving the first message. The second message includes instructions to the user equipment to temporarily suspend communication with the first relay station. The transmitting means can also transmit a third message to the first relay station.

In a further exemplary embodiment of the apparatus above, the receiving means is a receiver and the transmitting means is a transmitter.

Another exemplary embodiment in accordance with this invention is an apparatus for use in multi-hop relay networks. The apparatus includes a transceiver and a processing unit. The processing unit is configured to transmit via the transceiver a first message to a first access station and to receive via the transceiver a second message from the first access station. The processing unit is also configured to perform a scanning operation via the transceiver in response to receiving the second message.

In a further exemplary embodiment of the apparatus above, the first message includes an indication of a preferred user equipment instruction. The preferred user equipment instruction may be a sleep mode instruction or a scan mode instruction.

In another exemplary embodiment of any of the apparatus above, the scanning operation is performed during a downlink access zone period.

In a further exemplary embodiment of any of the apparatus above, the processing unit is also configured to receive via the transceiver a preamble from a second access station.

In another exemplary embodiment of any of the apparatus above, the processing unit is also configured to transmit the first message in response to a trigger condition being satisfied. The trigger condition may be a determination that the signal strength of the first access station has fallen below a threshold.

In a further exemplary embodiment of any of the apparatus above, the processing unit is also configured to measure one or more signal strengths. The processing unit may also be configured to transmit via the transceiver the measured signal strengths to the first access station.

In another exemplary embodiment of any of the apparatus above, the processing unit is also configured to determine whether a target access station serves a subordinate relay station. The processing unit may be configured to make this determination by determining whether a transmitted frame structure from the target access station includes downlink mappings. The processing unit may also be configured to transmit via the transceiver a third message requesting a handover to the target access station in response to determining that the target access station does not serve a subordinate relay station. The processing unit may also be configured to receive a handover response message including zone information of the target access station.

In a further exemplary embodiment of any of the apparatus above, the processing unit is also configured to receive via the transceiver information concerning one or more target access station. A selection one of the one or more target access station may be made. The processing unit is also configured to transmit via the transceiver the selection of one of the one or more target access station.

Another exemplary embodiment in accordance with this invention is an apparatus for use in multi-hop relay networks. The apparatus includes a means for transmitting a first message to an access station serving a first relay station. A means for receiving a second message from the access station is also included. The apparatus also includes a means for performing a scanning operation in response to receiving the second message.

In a further exemplary embodiment of the apparatus above, the receiving means is a receiver, the transmitting means is a transmitter and the scanning operation means is the receiver.

An exemplary embodiment in accordance with this invention is a method for use in multi-hop relay networks. The method includes transmitting a neighbor information message. The neighbor information message includes an offset indicating the start of a relay station zone in a frame structure.

In a further exemplary embodiment of the method above, the offset is indicated as a number of symbols following a preamble of the frame structure.

In another exemplary embodiment of any of the methods above, the methods are performed as a result of execution of computer program instructions stored in a computer readable memory medium.

A further exemplary embodiment in accordance with this invention is an apparatus for use in multi-hop relay networks. The apparatus includes a transmitter configured to transmit a neighbor information message. The neighbor information message includes an offset indicating the start of a relay station zone in a frame structure.

In another exemplary embodiment of the apparatus above, the offset is indicated as a number of symbols following a preamble of the frame structure.

A further exemplary embodiment in accordance with this invention is an apparatus for use in multi-hop relay networks. The apparatus includes a means for generating a neighbor information message including an offset indicating the start of a relay station zone in a frame structure. The apparatus also includes a means for transmitting the neighbor information message.

In another exemplary embodiment of the apparatus above, the generating means is a processor and the transmitting means is a transmitter.

A further exemplary embodiment in accordance with this invention is a method for use in multi-hop relay networks. The method includes receiving a neighbor advertising message from an access station serving a first relay station including at least one relay zone offset information of one or more neighbor access stations. The method also includes measuring a signature signal from a target access station. The target access station is one of the neighbor access stations. A handover is executed to the target access station in the relay zone indicated in the neighbor advertising message.

In another exemplary embodiment of the method above, the offset is indicated as a number of symbols following a preamble of the frame structure.

In a further exemplary embodiment of any of the methods above, the method also includes measuring a signature signal from at least one other neighbor access station. The target access station is the neighbor access station with the strongest signature signal.

In another exemplary embodiment of any of the methods above, the method is performed as a result of execution of computer program instructions stored in a computer readable memory medium.

A further exemplary embodiment in accordance with this invention is an apparatus for use in multi-hop relay networks. The apparatus includes a transmitter and a processing unit. The processing unit is configured to receive via the transmitter a neighbor advertising message from an access station serving a first relay station which includes one or more relay zone offset information of one or more neighbor access stations. The processing unit is also configured to measure via the transmitter a signature signal from a target access station. The target access station is one of the neighbor access stations. The processing unit is also configured to execute a handover to a target access station in the relay zone indicated in the neighbor advertising message.

In another exemplary embodiment of the apparatus above, the offset is indicated as a number of symbols following a preamble of the frame structure.

In a further exemplary embodiment of any of the apparatus above, the processing unit is also configured to measure via the transmitter a signature signal from at least one other neighbor access station. The target access station has the strongest signature signal measured.

Another exemplary embodiment in accordance with this invention is an apparatus for use in multi-hop relay networks. The apparatus includes means for receiving a neighbor advertising message from an access station serving a first relay station including at least one relay zone offset information of one or more neighbor access stations. The apparatus also includes means for measuring a signature signal from a target access station. The target access station is one of the neighbor access stations. Means for executing a handover to the target access station in the relay zone indicated in the neighbor advertising message are also included.

In a further exemplary embodiment of the apparatus above, the receiving means is a transmitter, the measuring means is a transmitter and the handover executing means is a processing unit.

Another exemplary embodiment in accordance with this invention is a method for use in multi-hop relay networks. The method includes receiving a broadcast message comprising instructions to a user equipment to temporarily suspend communication with a first relay station. The method also includes temporarily suspending communication with the first relay station, in response to receiving the message.

In a further exemplary embodiment of the method above, the broadcast message includes instructions to place the user equipment in a sleep mode, to place the user equipment in a scan mode and/or that no transmission and reception should occur for a period of time. The period of time may be specified as a number of frames.

In another exemplary embodiment of any of the methods above, the broadcast message comprises an extended downlink interval usage code.

In a further exemplary embodiment of any of the methods above, the instructions to the user equipment indicate a specific time for the temporary suspension of communication which is the same for at least one other user equipment that is in communication with the first relay station.

In another exemplary embodiment of any of the methods above, the method is performed as a result of execution of computer program instructions stored in a computer readable memory medium.

A further exemplary embodiment in accordance with this invention is an apparatus for use in multi-hop relay networks. The apparatus includes a transceiver and a processing unit. The processing unit is configured to receive, via the transceiver, a broadcast message comprising instructions to temporarily suspend communication with a first relay station. The processing unit is also configured to temporarily suspend communication with the first relay station, in response to receiving the message.

In another exemplary embodiment of the apparatus above, the broadcast message includes instructions to place the apparatus in a sleep mode, to place the apparatus in a scan mode and/or that no transmission and reception should occur for a period of time. The period of time may be specified as a number of frames.

In a further exemplary embodiment of any of the apparatus above, the broadcast message comprises an extended downlink interval usage code.

In another exemplary embodiment of any of the apparatus above, the instructions indicate a specific time for the temporary suspension of communication which is the same for at least one other apparatus that is in communication with the first relay station.

A further exemplary embodiment in accordance with this invention is an apparatus for use in multi-hop relay networks. The apparatus includes a means for receiving a broadcast message comprising instructions to a user equipment to temporarily suspend communication with a first relay station. The method also includes a means for temporarily suspending communication with the first relay station, in response to receiving the message.

In another exemplary embodiment of the apparatus above, the receiving means is a receiver, and the suspending means is a processing unit.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the TDD WiMAX system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    transmitting a first message to an access station serving a first relay station comprising a request for a temporary suspension of communication between the first relay station and at least one user equipment that is in communication with the first relay station;
    receiving a second message from the access station comprising an authorization of the temporary suspension of communication;
    in response to receiving the second message, performing a scanning operation during the temporary suspension of communication;
    determining whether a target access station has a configured relay zone; and
    in response to a determination that the target access station has a relay zone configured, transmitting a third message requesting a handover to the target access station.

2. The method of claim 1, wherein the first message comprises an indication of a preferred user equipment instruction to be sent to the at least one user equipment.

3. The method of claim 2, wherein the preferred user equipment instruction is one of a sleep mode instruction and a scan mode instruction.

4. The method of claim 1, wherein the temporary suspension of communication coincides with a downlink access zone period.

5. The method of claim 1, wherein the scanning operation comprises receiving a preamble from a second relay station.

6. The method of claim 1, wherein transmitting the first message is performed in response to a trigger condition being satisfied.

7. The method of claim 6, wherein the trigger condition is a determination that a signal strength of the access station at the first relay station has fallen below a threshold.

8. The method of claim 1, wherein the scanning operation comprises measuring at least one signal strength.

9. The method of claim 8, further comprising transmitting the at least one measured signal strength to the access station.

10. The method of claim 1, wherein the determination comprises determining whether a transmitted frame structure from the target access station comprises downlink mappings.

11. The method of claim 1, further comprising receiving a handover response message comprising relay zone offset information of the target access station.

12. The method of claim 1, further comprising receiving a neighbor advertising message comprising at least relay zone offset information of at least one neighbor access station.

13. The method of claim 1, wherein performed as a result of execution of computer program instructions stored in a computer readable memory medium.

14. An apparatus comprising at least one processor; and at least one memory including computer program code, the at least one memory and the computer program code configured to, with the at least one processor, cause the apparatus to perform at least the following:
    to transmit a first message to a first access station comprising a request for a temporary suspension of communication between the first relay station and at least one user equipment;
    to receive a second message from the first access station comprising an authorization of the temporary suspension of communication; and
    in response to receiving the second message, to perform a scanning operation at a specific time;
    to determine whether a target access station has a configured relay zone; and
    in response to a determination that the target access station has a relay zone configured, to transmit a third message requesting a handover to the target access station.

15. The apparatus of claim 14, wherein the first message comprises an indication of a preferred user equipment instruction to be sent to the at least one user equipment.

16. The apparatus of claim 15, wherein the preferred user equipment instruction is one of a sleep mode instruction and a scan mode instruction.

17. The apparatus of claim 14, wherein the temporary suspension of communication coincides with a downlink access zone period.

18. The apparatus of claim 14, wherein the processing unit is further configured to receive a preamble from a second access station.

19. The apparatus of claim 14, wherein the processing unit is further configured to transmit the first message in response to a trigger condition being satisfied.

20. The apparatus of claim 19, wherein the trigger condition is a determination that a signal strength of the access station at the first relay station has fallen below a threshold.

21. The apparatus of claim 14, wherein the processing unit is further configured to measure at least one signal strength during the scanning operation.

22. The apparatus of claim 21, wherein the processing unit is further configured to transmit the at least one measured signal strength to the first access station.

23. The apparatus of claim 14, wherein the processing unit is further configured to determine whether a transmitted frame structure from the target access station comprises downlink mappings.

24. The apparatus of claim 14, wherein the processing unit is further configured to receive a handover response message comprising relay zone offset information of the target access station.

25. The apparatus of claim 14, further comprising receiving a neighbor advertising message comprising at least relay zone offset information of at least one neighbor access station.

26. A non-transitory computer readable medium tangibly encoded with a computer program executable by a processor to perform actions comprising:
transmitting a first message to an access station serving a first relay station comprising a request for a temporary suspension of communication between the first relay station and at least one user equipment that is in communication with the first relay station;
receiving a second message from the access station comprising an authorization of the temporary suspension of communication; and
in response to receiving the second message, performing a scanning operation during the temporary suspension of communication;
determining whether a target access station has a configured relay zone; and
in response to a determination that the target access station has a relay zone configured, transmitting a third message requesting a handover to the target access station.

27. The computer readable medium of claim 26, wherein the first message comprises an indication of a preferred user equipment instruction to be sent to the at least one user equipment.

28. The computer readable medium of claim 27, wherein the preferred user equipment instruction is one of a sleep mode instruction and a scan mode instruction.

29. The computer readable medium of claim 26, wherein the temporary suspension of communication coincides with a downlink access zone period.

30. The computer readable medium of claim 26, wherein the scanning operation comprises receiving a preamble from a second relay station.

31. The computer readable medium of claim 26, wherein transmitting the first message is performed in response to a trigger condition being satisfied.

32. The computer readable medium of claim 31, wherein the trigger condition is a determination that a signal strength of the access station at the first relay station has fallen below a threshold.

33. The computer readable medium of claim 26, wherein the scanning operation comprises measuring at least one signal strength.

34. The computer readable medium of claim 33, further comprising transmitting the at least one measured signal strength to the access station.

35. The computer readable medium of claim 26, wherein the determination comprises determining whether a transmitted frame structure from the target access station comprises downlink mappings.

36. The computer readable medium of claim 26, where the actions further comprise receiving a handover response message comprising relay zone offset information of the target access station.

37. The computer readable medium of claim 26, where the actions further comprise receiving a neighbor advertising message comprising at least relay zone offset information of at least one neighbor access station.

38. An apparatus comprising:
means for transmitting a first message to an access station serving a first relay station comprising a request for a temporary suspension of communication between the first relay station and at least one user equipment that is in communication with the first relay station;
means for receiving a second message from the access station comprising an authorization of the temporary suspension of communication;
means for performing a scanning operation during the temporary suspension of communication in response to receiving the second message;
determination means for determining whether a target access station has a configured relay zone; and
means for transmitting a third message requesting a handover to the target access station in response to a determination that the target access station has a relay zone configured.

39. The apparatus of claim 38, wherein the first message comprises an indication of a preferred user equipment instruction to be sent to the at least one user equipment.

40. The apparatus of claim 39, wherein the preferred user equipment instruction is one of a sleep mode instruction and a scan mode instruction.

41. The apparatus of claim 38, wherein the temporary suspension of communication coincides with a downlink access zone period.

42. The apparatus of claim 38, wherein the scanning operation performing means comprises means for receiving a preamble from a second relay station.

43. The apparatus of claim 38, wherein transmitting the first message is performed in response to a trigger condition being satisfied.

44. The apparatus of claim 43, wherein the trigger condition is a determination that a signal strength of the access station at the first relay station has fallen below a threshold.

45. The apparatus of claim 38, wherein the scanning operation performing means comprises means for measuring at least one signal strength.

46. The apparatus of claim 45, further comprising means for transmitting the at least one measured signal strength to the access station.

47. The apparatus of claim 38, wherein the determination means comprises means for determining whether a transmitted frame structure from the target access station comprises downlink mappings.

48. The apparatus of claim 38, further comprising means for receiving a handover response message comprising relay zone offset information of the target access station.

49. The apparatus of claim 38, further comprising means for receiving a neighbor advertising message comprising at least relay zone offset information of at least one neighbor access station.

* * * * *